United States Patent
Zhou

(10) Patent No.: US 6,429,592 B1
(45) Date of Patent: Aug. 6, 2002

(54) HOUSING FOR FLUORESCENT LAMPS RETROFITTED DOUBLE ENDED SOCKETS

(76) Inventor: Shewen Zhou, 6907 NW. 82nd Ave., Miami, FL (US) 33166

( * ) Notice: Subject to any disclaimer, the term of this patent is extended or adjusted under 35 U.S.C. 154(b) by 0 days.

(21) Appl. No.: 09/839,864

(22) Filed: Apr. 20, 2001

(51) Int. Cl.[7] ................................................. H01J 7/44
(52) U.S. Cl. ..................... 315/56; 362/378; 362/260; 439/236; 315/159
(58) Field of Search ..................... 315/56, 159, 149; 362/378, 260; 439/236

(56) References Cited

U.S. PATENT DOCUMENTS 6,146,170 A * 11/2000 Fumin ........................ 439/236
6,206,545 B1 * 3/2001 Yan ............................ 362/249

* cited by examiner

Primary Examiner—Don Wong
Assistant Examiner—Tuyet T. Vo
(74) Attorney, Agent, or Firm—J. Sanchelima; A. Bordas

(57) ABSTRACT

A compact fluorescent lamp ballast housing compatible with double-ended socket assemblies including sockets at the ends of an elongated holder such as the ones used for quartz halogen and metal halide lamp fixtures. The housing supports multiple circular compact fluorescent lamps. The sockets are connected to opposite connector assemblies in the housing. Inside the housing an electronic ballast assembly is selectively turned on and off by a receiver assembly that is remotely actuated by a compatible transmitter assembly. The bottom of the housing includes a channel that substantially conforms to the elongated holder for the sockets to provide clearance for the holder and better mechanical engagement.

5 Claims, 2 Drawing Sheets

HOUSING FOR FLUORESCENT LAMPS RETROFITTED DOUBLE ENDED SOCKETS

BACKGROUND OF THE INVENTION

1. Field of the Invention

The present invention relates to compact fluorescent lamp ballast housings, and more particularly, to the type that are retrofitted to be received by double ended sockets such as those utilized for quartz halogen and metal halide lamps.

2. Description of the Related Art

Several compact fluorescent lamp ballast-housing designs have been developed in the past for replacing incandescent lamps with compact fluorescent lamps. Typically, the new sockets are made to fit existing conventional sockets for incandescent lamps. In the case of quartz halogen and metal halide lamps that utilize double-ended sockets none of the prior art designs have addressed this problem. The present invention provides a housing for a compact fluorescent lamp ballast that is volumetrically efficient while at the same time it is retrofitted or adapted to be received by double ended sockets such as those used with quartz halogen and metal halide lamps.

Quartz halogen lamps and metal halide lamps consume considerably more energy than compact fluorescent lamps. At the same time, quartz halogen and metal halide lamps operate at extremely high temperatures that have caused fires burning the fixture and even the premises. Thus the desirability of replacing them with low power consumption, low temperature, high efficiency compact fluorescent lamps is quite apparent.

SUMMARY OF THE INVENTION

It is one of the main objects of the present invention to provide a housing for compact fluorescent lamp ballast that is compatible with existing double-ended sockets used for metal halide and quartz halogen lamps.

It is another object of this invention to provide such a housing that is used to hold the energy efficient compact fluorescent lamp ballast and to hold the circular type fluorescent lamp with either multiple rings or single ring.

It is another object of this invention to provide such a housing that is volumetrically efficient.

It is still another object of the present invention to provide such a housing that includes a receiver actuated by a cooperating transmitter for remotely turning the ballast on and off.

It is yet another object of this invention to provide such a device that is inexpensive to manufacture and maintain while retaining its effectiveness.

It is another object of this invention to provide such a housing that is easy to be installed to replace the conventional double-ended halogen lamps and metal halide lamps with the compact fluorescent lamps.

It is another object of this invention to provide such a housing with apertures appropriately disposed to facilitate the ventilation of the ballast.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE PREFERRED EMBODIMENT

Figure 1:
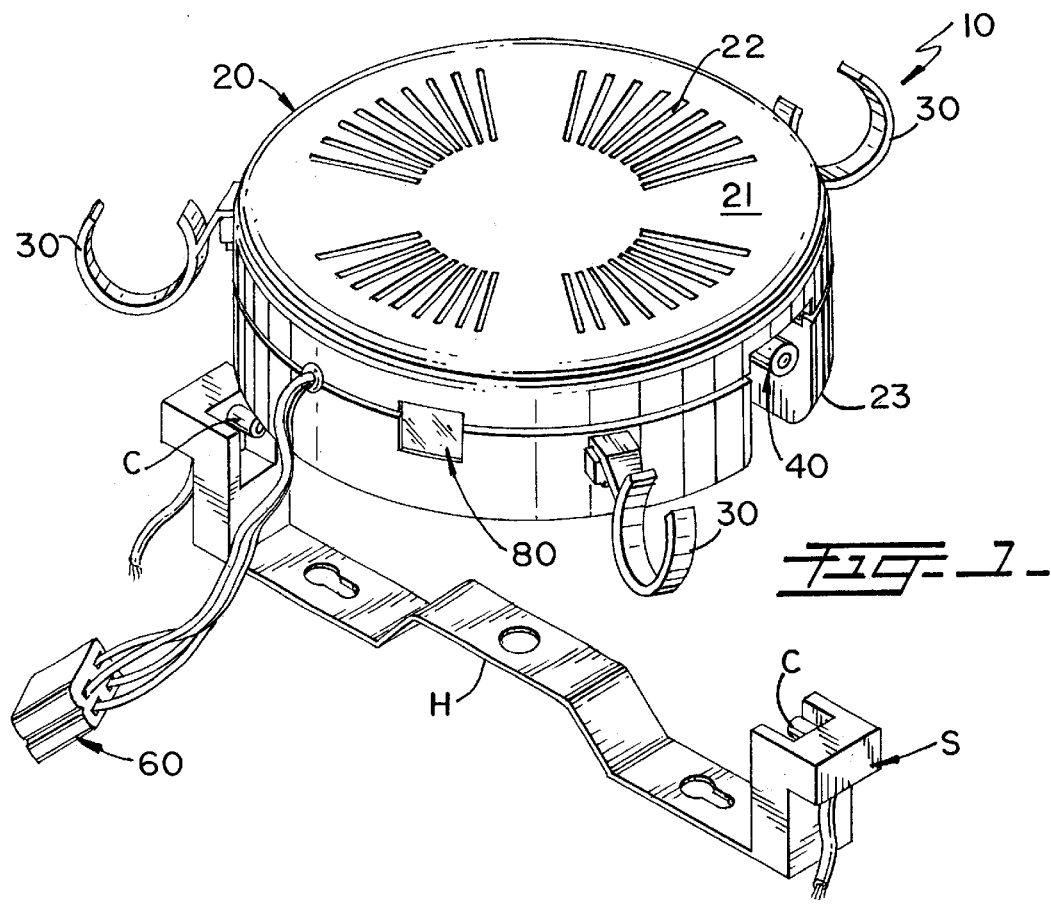
FIG. 1 represents an isometric view of a double-ended fixture for ballast connectors incorporating the present invention.
Figure 2:
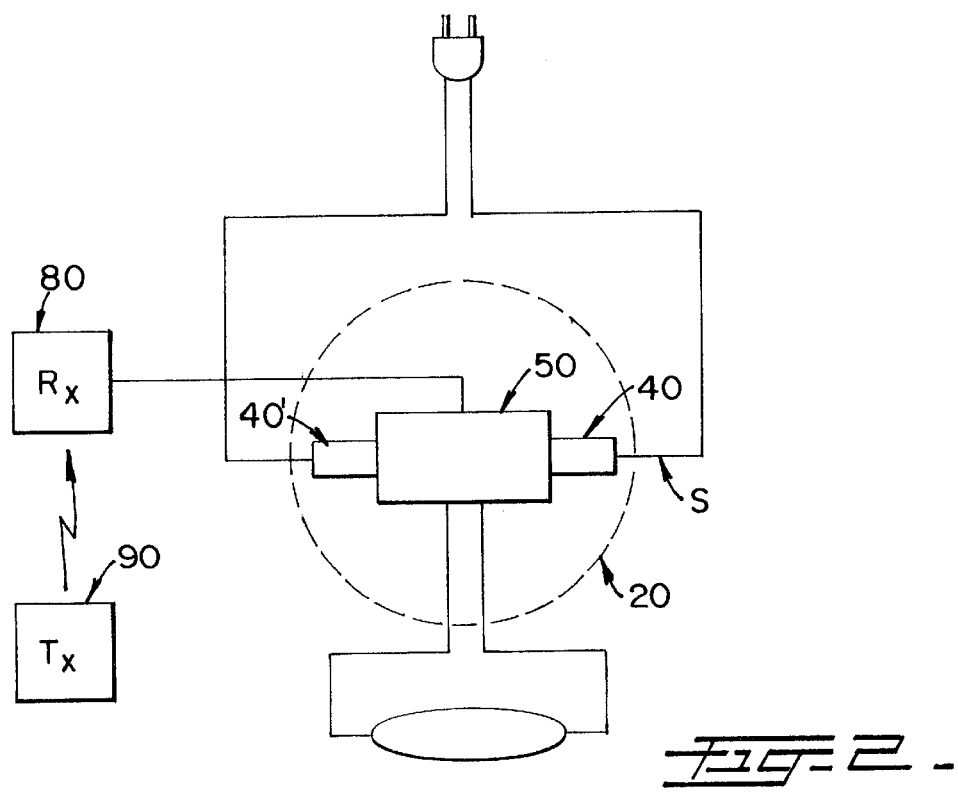
FIG. 2 shows an electric diagram of the present invention.
Figure 3:
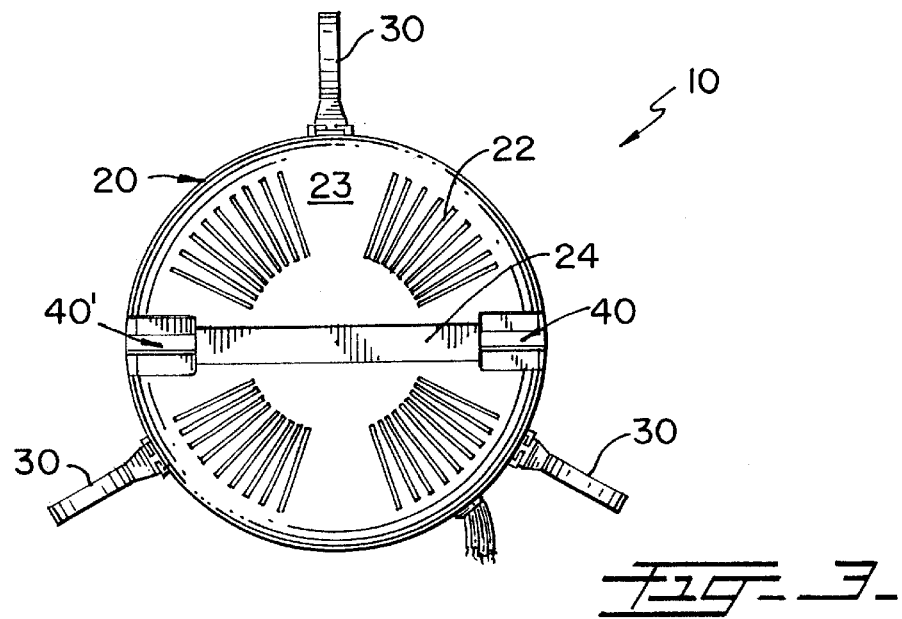
FIG. 3 illustrates is a bottom view of one of the preferred embodiments for the present invention.

Referring now to the drawings, where the present invention is generally referred to with numeral 10, it can be observed that it basically includes housing 20, holders 30, contact assemblies 40 and 40', electronic ballast assembly 50, electrodes jack assembly 60, receiver 80 and transmitter 90, mounted on socket S. Socket S corresponds to those used for metal halide and quartz halogen lamps.

Figure 4:
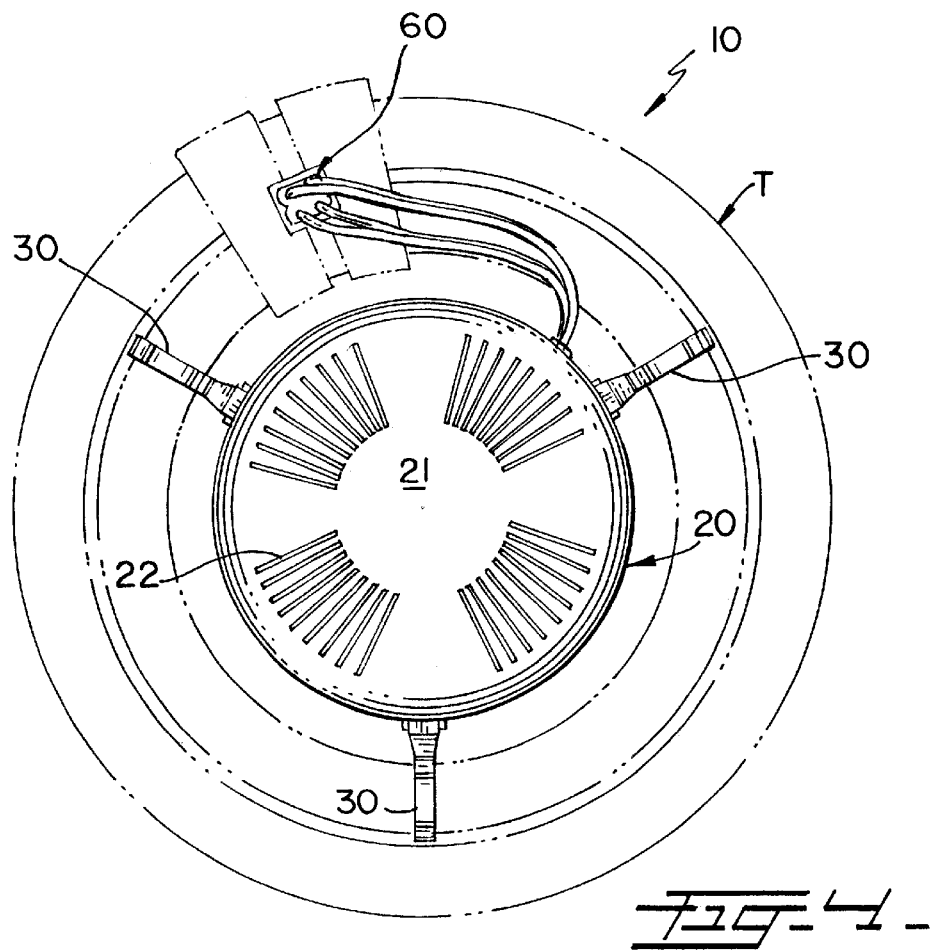
FIG. 4 is a top view of the housing shown in the previous figure.

As seen in FIG. 1, housing 20 has preferably a cylindrical shape. It cooperates with the shape of circular compact fluorescent tubes T as best seen in FIG. 4. Holders 30 are intended to hold tubes T in place. Holders 30 have a cooperative shape to support compact fluorescent tube T. Housing 20 includes apertures 22 appropriately disposed at top 21 and bottom 23 of housing 20 to facilitate ventilation. Bottom 23 includes channel 24 that extends across the middle of bottom 23. Channel 24 cooperates to receive holder H of socket S, for a better mechanical engagement.

Socket S is a typical socket used for non-circular fluorescent tube lamps. Socket S has two socket contacts C where typical non-circular quartz halogen and metal halide lamps fluorescent tubes are connected. Elongated holder H has two ends where sockets S are mounted.

Contact assemblies 40 and 40' protrude radially outwardly from housing 20. Their separation coincides with the separation of contacts C. Electronic ballast assembly 50 is implemented with circuits such as those manufactured by General Electric under model No. FEH55 2D/DA/120 55W 2D. These electronic ballasts are selectively turned on and off through an electronic input. In the preferred embodiment, this on/off signal is generated by receiver assembly 80 when activated by transmitter assembly 90. Receiver 80 and transmitter 90 can communicate using radiofrequency signals that radiate everywhere or more directed signals such as infrared. In this manner, a user can remotely turn on electronic ballast assembly 50 and thus the lamp.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A housing assembly for a compact fluorescent lamp, comprising:

A) an electrically powered double ended socket assembly having an elongated holder with two ends and a socket on each end;

B) a substantially cylindrical housing member having two ballast connectors disposed opposite to each other at the periphery of said housing member, and said connectors being separated by a predetermined distance for cooperative engagement and electrical connection of said connectors with the socket of said electrically powered double ended socket assembly, and said housing including means for supporting at least one circular fluorescent lamp;

C) an electronic ballast mounted inside said housing

D) means for connecting said electronic ballast to said compact fluorescent lamp;

E) switching means for selectively interrupting the operation of said electronic ballast thereby causing said lamps to turn on and off;

F) receiver means for actuating said switch means; and

G) transmitter means for communicating with said receiver means so that said switching means can be remotely actuated.

2. The housing assembly set forth in claim 1 wherein said housing member includes a bottom having a channel for cooperatively lodging said elongated holder thereby enhancing the mechanical engagement of said housing to said double ended socket assembly.

3. The housing assembly set forth in claim 2 wherein said housing member includes a top and a bottom including a plurality of ventilation apertures.

4. The housing assembly set forth in claim 3 wherein said receiver and transmitter means use radiofrequency signals.

5. The housing assembly set forth in claim 3 wherein said receiver and transmitter means use infrared signals.

* * * * *